United States Patent
Dyrbusch et al.

(10) Patent No.: US 8,180,555 B2
(45) Date of Patent: May 15, 2012

(54) PROCEDURE AND DEVICE FOR A PRESSURE DETERMINATION

(75) Inventors: Damian Dyrbusch, Ludwigsburg (DE); Angelo Mazzon, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 12/484,343

(22) Filed: Jun. 15, 2009

(65) Prior Publication Data
US 2009/0319155 A1    Dec. 24, 2009

(30) Foreign Application Priority Data
Jun. 18, 2008    (DE) .................... 10 2008 002 490

(51) Int. Cl.
*B60T 7/12* (2006.01)
(52) U.S. Cl. .......................................... 701/104; 60/274
(58) Field of Classification Search .......... 701/103–105, 701/108, 114, 115; 60/274, 276, 285, 286, 60/295, 297, 300, 303, 311, 324; 123/698
See application file for complete search history.

(56) References Cited

U.S. PATENT DOCUMENTS

| | | | | |
|---|---|---|---|---|
| 4,685,290 A | * | 8/1987 | Kamiya et al. | 60/274 |
| 5,826,425 A | * | 10/1998 | Rossi Sebastiano et al. | 60/274 |
| 7,665,295 B2 | * | 2/2010 | Pfaeffle et al. | 60/286 |

FOREIGN PATENT DOCUMENTS

| | | |
|---|---|---|
| DE | 10 2004 031 321 | 1/2006 |
| DE | 10 2006 009 921 | 9/2007 |
| EP | 1 130 227 | 9/2001 |

* cited by examiner

*Primary Examiner* — John Kwon
(74) *Attorney, Agent, or Firm* — Merchant & Gould P.C.

(57) ABSTRACT

A method of determining a pressure at a dosing valve of a fuel metering device for metering fuel into an exhaust gas system of a combustion engine with a component of the combustion engine assigned to an exhaust gas system for a regeneration, a temperature impingement and/or a thermo management. The fuel is injected in a flow direction of the exhaust gas in front of the component, and metering of the fuel is determined by an injection valve from a cycle duration and a duty cycle relation for controlling a shut-off valve and the dosing valve depending on a difference pressure. The method includes determining a pressure before the dosing valve via acquisition and processing of at least one replacement value deduced from a pressure sensor signal of a pressure sensor arranged in a flow direction of the fuel behind the dosing valve for recording a measured pressure.

15 Claims, 2 Drawing Sheets

PROCEDURE AND DEVICE FOR A PRESSURE DETERMINATION

TECHNICAL FIELD

The invention concerns a procedure for a pressure determination at a dosing valve of a fuel metering device for metering fuel into an exhaust gas system of a combustion engine with a component of the combustion engine that is assigned to an exhaust gas system for a regeneration, for a temperature impingement and/or for a thermo management, whereby the fuel is injected in flow direction of the exhaust gas in front of this component, whereby the metering of the fuel is determined by an injection valve from a cycle duration and a duty cycle relation for controlling a shut-off valve and the dosing valve depending on a difference pressure.

The invention concerns furthermore a corresponding device for implementing the procedure.

BACKGROUND

Due to currently planned statutory provisions the particle emission of a combustion engine, in particular a diesel motor, has to be controlled before and/or after a particle filter during the driving operation, for example of a diesel particle filter (DPF). Furthermore a load prognosis of the diesel particle filter is required for a regeneration control in order to achieve a high system security and to be able to use cost-efficient filter material. Furthermore a regulation of the combustion features of the combustion engine can be provided on the basis of the information about the particle emission.

Particle filter provide however a limited storage capability for soot and have to be regenerated in certain intervals for the recovery of the purification effect. A controlling of the regeneration of the particle filter can either take place passively or actively. A high particle load of the filter causes an improperly high increase of the exhaust gas counter pressure.

In simple, actively operated procedures usually a driven route or an operating time of the combustion engine are taken as a basis for the implementation of the regeneration of the filter in fixed intervals. This typically takes place every 250 to 1000 km. at soot particle filters the regeneration takes place by an increase of the exhaust gas temperature up to typically 550° C. to 650° C. That can take place by measures in the mixture preparation of the engine or by post-motoric measures. Thereby an exothermal reaction is activated, which causes a burn-off of the soot and which regenerates the particle filter within a few minutes (for example 20 minutes).

Thus a system became known for example from EP 1130227 A1 for supporting the regeneration of a particle filter that is arranged in an exhaust gas area of a combustion engine, at which the exhaust gas temperature is increased for starting and maintaining the particle regeneration by adding hydrocarbons (HC) into the exhaust gas area. The increase of the exhaust gas temperature takes basically place by at least one fuel after injection into the combustion engine, which causes an increased HC-percentage, which reacts exothermally in an oxidization catalytic converter, which is arranged in the flow direction of the exhaust gas before the particle filter.

DE 10 2004 031 321 A1 and DE 10 2006 009 921 A1 suggest a procedure for metering a fuel into an exhaust gas duct of a combustion engine and a device for implementing the procedure.

Such a system, at which temporarily an exactly metered fuel amount is injected into the exhaust gas system for the regeneration of the particle filter, is also known under the name DEPARTRONIC by the applicant and is particularly provided for the use in utility vehicles with diesel engines. The HC-metering is determined from a cycle duration T and a duty cycle t1 for controlling a shut-off valve (SV) and a dosing valve (DV) depending on a pressure $p_1$, measured with a pressure sensor, which is arranged in flow direction of the fuel in front of the dosing valve (DV), within a fuel metering device according to a polynomial procedure, in order to meter a desired HC-mass flow into the exhaust gas system, whereby the calculated values are send to the corresponding device driver of the shut-off valve (SV) and the dosing valve (DV). Thereby the following relation is the basis:

$$Q = f(p, TV) \qquad (1)$$

Whereby Q means the flow rate in g/min, p the difference pressure in bar above the dosing valve (DV) and TV the duty cycle in %. Corresponding power supply parameters (cycle duration T and duty cycle $t_i$) for controlling the shut-off valve (SV) and the dosing valve (DV) arise from a polynomial of the type $$T, t_i = f(p, \Delta p^2) \qquad (2)$$

A further pressure sensor for determining a pressure $p_2$ behind the dosing valve (DV) is currently used for the purpose of the diagnosis in the scope of the on-board-diagnosis (OBD).

It is currently disadvantageously that under practical conditions in the low pressure circuit (LPC) pressure peaks can occur, which can burst the first pressure sensor for determining the pressure $p_1$. Furthermore such a pressure sensor increases the price of the current system.

It is therefore the task of the invention to establish a procedure, with which a pressure sensor could be waived for determining the pressure $p_1$ and a value for the pressure $p_1$ can be generated from other variables. It is furthermore the task of the invention to provide a corresponding device.

SUMMARY

The task that concerns the invention is thereby solved, in that a pressure $p_2$ before the dosing valve is determined by the acquisition and processing of at least one replacement value, which is deduced from signals of a pressure sensor that is arranged in flow direction of the fuel behind the dosing valve for recording a measured pressure $p_2$. With this procedure the pressure sensor can be saved for determining the pressure $p_1$ on the one hand, which would reduce the expenditure. On the hand a replacement strategy can be provided thereby at a defect pressure sensor for determining the pressure $p_1$, if an amount conversion in the fuel metering device is still based on the pressure $p_1$, so that the system can be still operated. By the implementation of this procedure the robustness of the fuel metering device can be increased especially towards occurring pressure peaks in the low pressure circuit (LPC).

It is thereby provided in a preferred procedure alternative that the temporal course of the measured pressure $p_2$ during the cycle duration of the switching signal is detected for dosing valve and the maximum is determined and kept until the next cycle. From the maximums of the measured pressure $p_2$ a $p_{2max}$ wrap curve is determined in a next step and the pressure $p_1$ is deduced with the aid of an offset characteristic line. Thereby it is taken advantage of the fact that a proportion exists between the p_wrap curve plus offset characteristic line and the pressure drop above the dosing valve (DV), so that thereby the $p_1$-pressure signal can be generated. It is advantageously thereby that the resource-protecting polynomial procedure can be further used.

At minimum amounts the offset characteristic line has to be corrected according to the amount demand, since the actual maximum value is not detected at the pressure sensor for determining the pressure $p_1$ at small dosing valve opening times.

A polynomial is then determined for the calculation of power supply parameters for the dosing valve with the aid of the $p_{2max}$ wrap curve according to the preferred procedure alternative under consideration of a minimum temperature of the fuel and the corrected offset characteristic line at small metering amounts.

The task that concerns the procedure provides with regard to the implementation of the previously described pressure determination procedure that the fuel metering device has a control unit, which provides an arithmetic unit for determining the $p_{2max}$ wrap curve from the measured pressure $p_2$ of the pressure sensor that is arranged in flow direction of the fuel behind the dosing valve as well as an engine map unit for generating an offset characteristic line for determining a replacement value for the pressure $p_1$ in front of the dosing valve. It is thereby furthermore provided that the control unit has a further engine map unit for correcting the offset characteristic line at a small amount demand. With the aid of the replacement value for the pressure $p_1$ and the median temperature of the fuel the polynomial can be determined in an arithmetical unit within the control unit and power supply parameters for the dosing valve in a conversion unit. This functionality can be implemented as hard- or software.

A further preferred procedure alternative provides that within a detection time smaller than 10 ms, typically within approximately 6 ms, after a carried out controlling of the dosing valve the pressure course of the measured pressure $p_2$ is evaluated for the determination of the replacement value for $p_1$, because the average value that adjusts in the operation at the pressure sensor $p_2$ does not allow a sufficient statement about the supply pressure in front of the dosing valve for calculating the HC-mass flow, as it has been shown by pressure measurements with different pressures $p_1$ in the low pressure circuit (LPC). For this purpose the inertia or dynamic behavior of the dosing valve (DV) and the injection valve (IV) of the fuel metering device are used for the acquisition of a replacement value. Accordingly the pressure course of the pressure $p_2$ is only considered in the first milliseconds after opening the dosing valve and before a "rattle behavior" of the injection valve (IV). The "rattle behavior" of the injection valve (IV) expresses itself in pressure deviations, which occur in short distances.

The maximum value of the measured pressure $p_2$ within the detection time can be used as a replacement value on the one hand. A further preferred strategy provides that the average value between the maximum measured pressure $p_2$ (highest crest) and a minimum measured value (lowest crest) is used as a replacement value. Also the average value of two consecutive pressure peaks of the measured pressure $p_2$ or the average value of a maximum and minimum pressure peak within the detection time can be used as a replacement value.

For the acquisition of the above described replacement values the pressure course of the measured pressure $p_2$ is digitally scanned with a high sampling rate taking a triggering by the control signal of the dosing valve into account. According to the invention a sampling rate can thereby be diverted from another sensor for the duration of the acquisition.

A preferred application of the previously described procedure alternatives provides the use in a fuel metering device for a regeneration, for a temperature impingement and/or for a thermo management of a component that is assigned to an exhaust gas system of a combustion engine of motor vehicles, which are operated with diesel. An effective and flexible regeneration of the particle filter can thereby be for example established or supported in particular in utility vehicles.

The functionality of the procedure alternatives can thereby be implemented as software module in the control unit of the fuel metering device or in a superior engine control.

BRIEF DESCRIPTION OF THE DRAWINGS

The invention is further explained in the following with the aid of an embodiment that is illustrated in the figures. It is shown.

DETAILED DESCRIPTION

Figure 1:
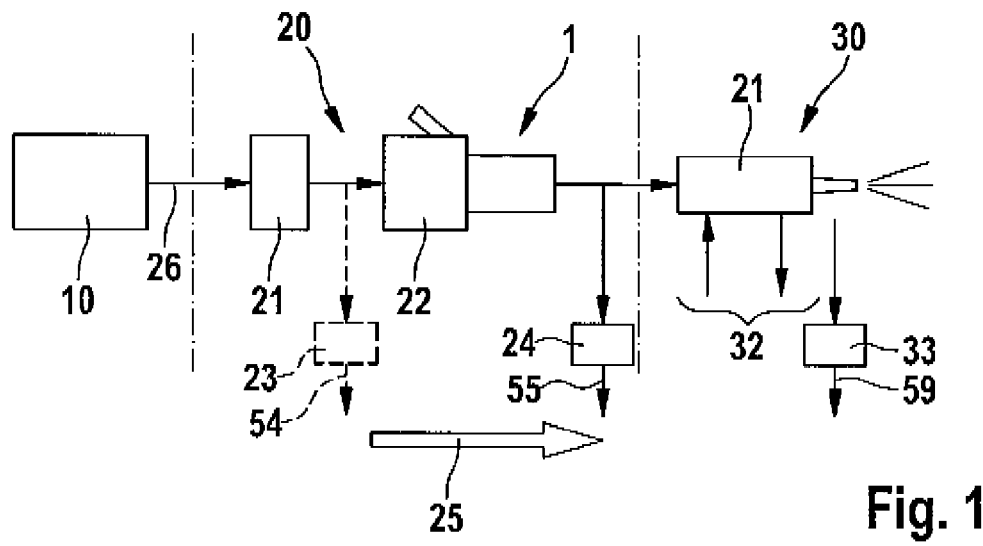
FIG. 1 is a fuel metering device of a combustion engine in a schematic illustration.

FIG. 1 shows schematically a fuel metering device 1 for a regeneration of a particle filter in the exhaust gas system of a combustion engine, which can be operated with diesel. As the main components the fuel metering device 1 provides a low pressure circuit 10 for the fuel, a fuel metering device 20 and an injection unit 30, which injects the fuel into the exhaust gas system of the combustion engine in the flow direction of the exhaust gas before the particle filter.

From the low pressure circuit 10 a fuel flow 26 takes place in the direction of the fuel metering device 20, which provides a shut-off valve 21 (SV) and a dosing valve 22 (DV). A metering of hydrocarbons (HC) takes place by a temporal controlling of the switch-off valve 21 and the dosing valve 22, whereby the desired HC-mass flow is basically determined from the cycle duration and a duty cycle for controlling the shut-off valve 21 and the dosing valve 22. The calculated values are sent to the component driver for the shut-off valve 21 and the dosing valve 22.

A present pressure 25 above the dosing valve 22 is determined according to the state of the art with the aid of pressure sensors 23, 24, which are arranged at the inlet and outlet of the dosing valve 22. A measured pressure $p_1$ 54 can thereby be determined with the pressure sensor 23 and a measured pressure $p_2$ 55 with the pressure sensor 24. For the temperature determination of the fuel the pressure sensor 23 at the inlet can be construed as a combined pressure/temperature sensor. The temperature determination at the outlet of the dosing valve 22 for example in the position of the pressure sensor 24 is also possible.

The injection unit 30 at the exhaust gas system of the combustion engine basically consists of an injection valve 31 (IV), which provides a cooling water supply/drain 32 for cooling the injection valve 31. With a pressure sensor 33 in the exhaust gas duct of the combustion engine an exhaust gas counter pressure 59 can be determined.

According to the procedure according to the invention it is provided, that the pressure sensor 23 can be waived and the measured pressure $p_1$ 54 is replaced by the acquisition of a replacement value for the determination of the pressure $p_1$ 53. Thereby the pressure $p_1$ 53 is determined before the dosing valve 22 from the acquisition and processing of at least one replacement value, which is deduced from signals of a pressure sensor 24 that is arranged in flow direction of the fuel behind the dosing valve 22 for recording a measured pressure $p_2$ 55 and/or from the dynamic behavior of the injection valve 31.

Figure 2:
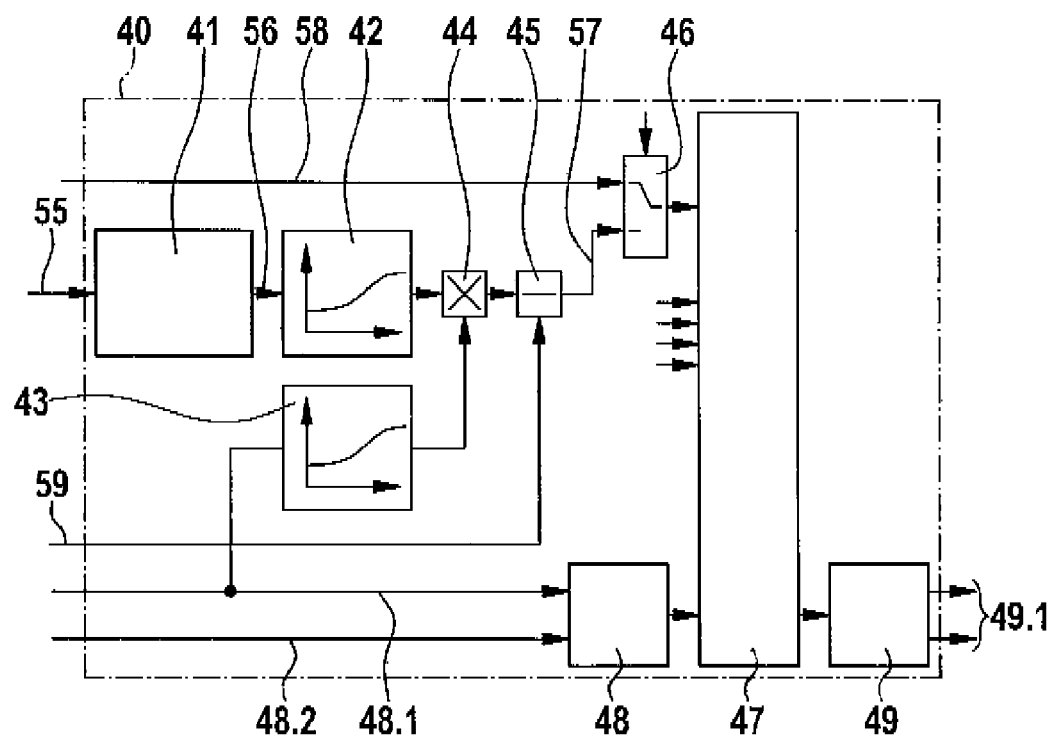
FIG. 2 is a schematic illustration of a block diagram for implementing the procedure according to the invention.

FIG. 2 schematically shows the process course of a procedure alternative according to the invention with the aid of a block diagram.

Illustrated is a control unit 40, which can for example be a component of a superior control unit for the fuel metering device. That provides an arithmetic unit 41 for determining a $p_{2max}$ wrap curve 56 from a measured pressure $p_2$ 55 of a pressure sensor 24 that is arranged in flow direction of the fuel behind the dosing valve 22 (see FIG. 1). Thereby the temporal course of the measured pressure $p_2$ 55 is detected during the cycle duration of the switch signal for the dosing valve 22 and the maximum is determined. From the maximums of the measured pressure $p_2$ 55 then the $p_{2max}$ wrap curve is determined. In a engine map unit 42 that is subordinate to the arithmetic unit 41 an offset characteristic line is generated from the $p_{2max}$ wrap curve, from which the exhaust gas counter pressure 59, measured in the area of the injection unit 30, is subtracted in a difference unit 45. That signal is equivalent to a signal for a modeled difference pressure 57, which is introduced over a switching unit 46 of an arithmetic unit 47. That modeled difference pressure 57 can serves as a replacement of a measured difference pressure 58, which results from the difference between the measured pressure $p_1$ 54, determined with the pressure sensor 23 before the dosing valve 22 (see FIG. 1), and the exhaust gas counter pressure 59. In the case of a defect pressure sensor 23 it can be switched then from the measured difference pressure 58 to the modeled difference pressure 57 with the aid of the switch unit 46. If an omission of the pressure sensor 23 is provided in order to save costs, only the modeled difference pressure 57 is supplied to the arithmetic unit 47. That has the advantage that the computing algorithms can be maintained unmodified within the arithmetic unit 47, here in particular the polynomial determination.

The control unit 40 provides in addition to the minimum amount correction a further engine map unit 43 for correcting the offset characteristic line at a small amount demand 48.1. As the output signal of the engine map unit 43 a correction term is generated, which is connected with the ad of a multiplication unit 44 with the offset characteristic line that has been generated by the engine map unit 42.

In a correction unit 48 a temperature correction is carried out with the aid of the signals for the amount demand 48.1 and a median temperature 48.2 of the fuel and a corresponding correction signal is sent to the arithmetic unit 47.

The determination of the polynomial that has been mentioned in the beginning for generating the power supply parameters 49.1, which are converted in a conversion unit 49 in corresponding values for the cycle duration and duty cycle for controlling the shut-off valve 21 (SV) or the dosing valve 22 (DV), takes place in the arithmetic unit 47.

The previously described functionality of the procedure can be implemented as hard- and/or software.

Figure 3:
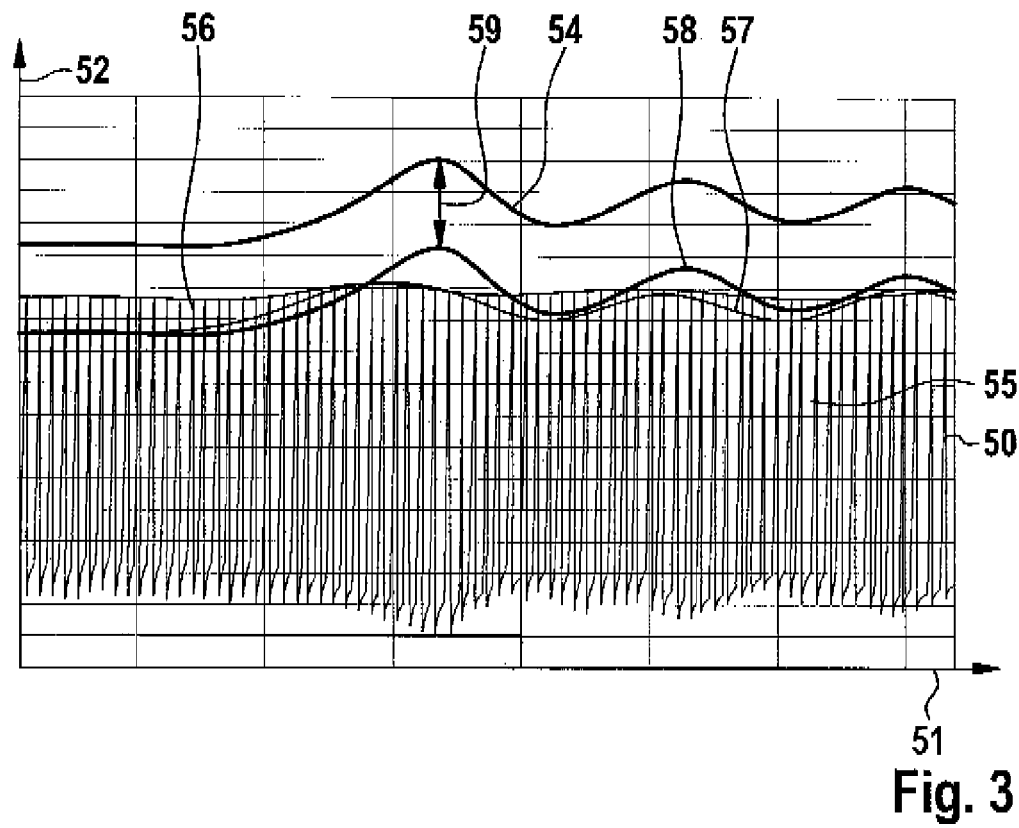
FIG. 3 is a pressure course diagram.

FIG. 3 shows exemplary a pressure course diagram as the result of the previously described procedure alternative. Illustrated is a pressure 52 depending on the time 51.

A curve shows the periodic pressure deviations for the measured pressure $p_2$ 55 as well as the $p_{2max}$ wrap curve 56 that is deduced from that. From the previously described corrections regarding the exhaust gas counter pressure 59 and if necessary the minimum amount correction at very small amount demands 48.1 a modeled difference pressure 57 results from the $p_{2max}$ wrap curve 56, which can serve as input value for the polynomial determination for calculating the power supply parameter 49.1. For a comparison the course of the measured difference pressure 58 is illustrated, which results from the difference between the measured pressure $p_1$ 54 and the exhaust gas counter pressure 59. As it can be noticed both curves, measured difference pressure 58 and modeled difference pressure 57 from the measured pressure $p_2$ 55, concur pretty well. Despite of a minimal tolerance impairment in the dynamic area the modeled difference pressure 57 can therefore be used as replacement value for the measured difference pressure 58 at the determination of the power supply parameters 49.1.

Figure 4:
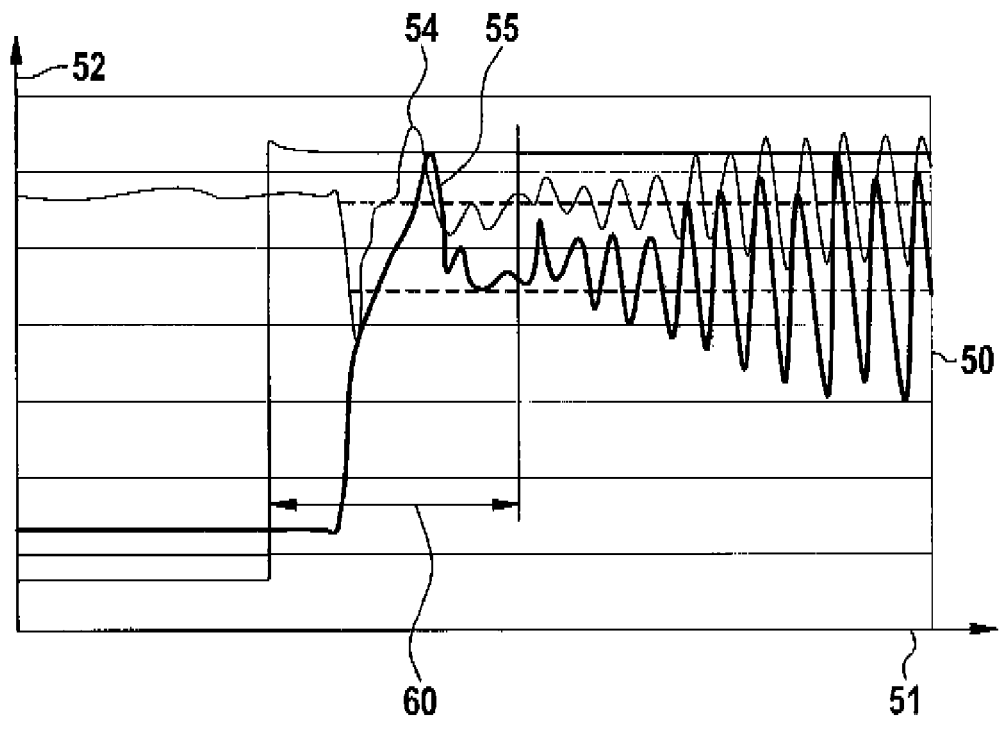
FIG. 4 is a further pressure course diagram for determining replacement values for the pressure $p_1$.

FIG. 4 shows another, also preferred strategy for the acquisition of a replacement value for the measured pressure $p_1$ 54. The pressure 52 is illustrated depending on the time 51 in the pressure course diagram 50 like in FIG. 3. Thereby the pressure course of the measured pressure $p_2$ 55 is evaluated within a short detection time 60 after a carried out controlling of the dosing valve 22 for determining the replacement value for the measured pressure $p_1$ 54. It turned out that the pressure course of the measured pressure $p_2$ 55 is similar to the measured pressure $p_1$ 54 in particular within this detection time 60, which is shorter than 10 ms, typically approximately 6 ms, and that one can for example determine a replacement value for the measured pressure $p_1$ 54 for example with the aid of the evaluation of the maximum value of the measured pressure $p_2$ 55 within this detection time 60.

It turned out that a deduction of a replacement value is not possible in a reproducible way for a time after this detection time 60, because the measured pressure $p_2$ 55 and also the measured pressure $p_1$ 54 start to oscillate enormously due to the dynamic behavior of the injection valve 31 that is shown in FIG. 1, which is termed as "rattling" of the injection valve 31. Average value considerations at the measured pressure $p_2$ 55 as replacement values for the measured pressure $p_1$ 54 have shown no significant dependencies or did not have many errors.

Further procedure alternatives provide that the average value between the measured maximum pressure $p_2$ 55 and a measured minimum value, the average value of two consecutive pressure peaks of the measured pressure $p_2$ 55 or the average value of a value of a maximum and minimum pressure peaks within the detection time 60 are used as replacement value for the measured pressure $p_1$ 54. For this purpose it is provided for the acquisition of the replacement values that the pressure course of the measured pressure $p_2$ 55 is digitally scanned with a high sampling rate taking a triggering into account by the control signal of the dosing valve 22, whereby it can also be provided that a sampling rate is converted from another sensor for the duration of the acquisition.

With the described procedure alternatives and the device the pressure sensor 23 for determining the pressure p1 before the dosing valve 22 can be saved and a replacement strategy can be provided at a defect pressure sensor 23. Thereby the robustness of the fuel metering device 1 can be increased. In both cases the evaluation algorithm for the determination of the power supply parameters 49.1 for the dosing valve 22 can be maintained.

The invention claimed is:

1. A method of evaluating a pressure at a dosing valve of a fuel metering device for metering fuel into an exhaust gas system of a combustion engine, wherein a component of the combustion engine is assigned to the exhaust gas system for at least one of a regeneration, a temperature impingement and a thermo management, and wherein fuel is metered in a flow direction of the exhaust gas in front of the component with an injection valve from a cycle duration and a duty cycle relation of a switching signal for controlling a shut-off valve and the dosing valve depending on a difference pressure, the method comprising:

determining a wrap curve from a measured pressure of a pressure sensor arranged in a flow direction of the fuel behind the dosing valve; and generating an offset characteristic line for determining a modeled pressure difference value, wherein a pressure difference value for a pressure measured in front of the dosing valve is replaceable with the modeled pressure difference value.

2. The method of claim 1, further comprising detecting a temporal course of the measured pressure during the cycle duration of the switching signal for the dosing valve and evaluating a maximum of the measured pressure.

3. The method of claim 2, further comprising evaluating a measured pressure wrap curve from the maximum of the measured pressure and deducing the pressure before the dosing valve via an offset characteristic line.

4. The method of claim 3, further comprising correcting the offset characteristic line at dosing amounts below a certain value according to an amount demand.

5. The method of claim 4, further comprising determining a polynomial for a calculation of power supply parameters for the dosing valve with the aid of the measured pressure wrap curve considering a fuel median temperature and the corrected offset characteristic line at metering amounts below a certain value.

6. The method of claim 2, further comprising evaluating the temporal course of the measured pressure within a detection time of less than 10 ms after a dosing valve actuation for determining the at least one replacement value.

7. The method of claim 6, further comprising using a value of the maximum of the measured pressure as the at least one replacement value.

8. The method of claim 6, further comprising using an average value between a value of the maximum of the measured pressure and a measured minimum value as the at least one replacement value.

9. The method of claim 6, further comprising using an average value of consecutive pressure peaks of the measured pressure as the at least one replacement value.

10. The method of claim 6, further comprising using an average value of a maximum and minimum pressure peak within the detection time as the at least one replacement value.

11. The method of claim 2, further comprising digitally scanning the pressure course of the measured pressure to acquire the at least one replacement value with a high sampling rate and considering a triggering by the control signal of the dosing valve, wherein a sampling rate is diverted from another sensor for duration of the acquisition.

12. The method of claim 1, further comprising operating the combustion engine with a diesel fuel.

13. A control unit configured to implement a method of evaluating a pressure at a dosing valve of a fuel metering device for metering fuel into an exhaust gas system of a combustion engine, wherein a component of the combustion engine is assigned to the exhaust gas system for at least one of a regeneration, a temperature impingement and a thermo management, and wherein fuel is metered in a flow direction of the exhaust gas in front of the component with an injection valve from a cycle duration and a duty cycle relation of a switching signal for controlling a shut-off valve and the dosing valve depending on a difference pressure, the control unit comprising:

a first arithmetic unit configured for determining a wrap curve from a measured pressure of a pressure sensor arranged in a flow direction of fuel behind the dosing valve; and a first engine map unit configured for generating an offset characteristic line for determining a modeled pressure difference value that can replace a pressure difference value for a pressure measured in front of the dosing valve.

14. The control unit of claim 13, further comprising a second engine map unit for correcting the offset characteristic line at an amount demand below a certain value.

15. The control unit of claim 13, wherein with the replacement value and a median temperature of the fuel, a polynomial is determined in a second arithmetic unit and power supply parameters for the dosing valve in a conversion unit.

* * * * *